(12) United States Patent  (10) Patent No.: US 8,660,546 B2
Hayashi et al.  (45) Date of Patent: Feb. 25, 2014

(54) INFORMATION PROCESSING APPARATUS, NAVIGATION SYSTEM, AND DATA UPDATING METHOD

(75) Inventors: Kazushige Hayashi, Toyota (JP); Ryuuji Sakata, Kariya (JP); Takahisa Ozaki, Gamagori (JP); Soichi Saito, Obu (JP); Suguru Matsushita, Obu (JP); Masao Sasaki, Okazaki (JP)

(73) Assignees: Toyota Jidosha Kabushiki Kaisha, Toyota-shi, Aichi-ken (JP); Denso Corporation, Kariya, Aichi-Pref (JP)

( * ) Notice: Subject to any disclaimer, the term of this patent is extended or adjusted under 35 U.S.C. 154(b) by 20 days.

(21) Appl. No.: 13/273,270

(22) Filed: Oct. 14, 2011

(65) Prior Publication Data

US 2012/0094644 A1  Apr. 19, 2012

(30) Foreign Application Priority Data

Oct. 15, 2010  (JP) ................................ 2010-232860

(51) Int. Cl.
*H04M 3/00*  (2006.01)

(52) U.S. Cl.
USPC ........ 455/418; 455/408; 455/412.1; 455/517; 455/557; 455/569.1; 455/569.2; 455/575.9

(58) Field of Classification Search
USPC .............. 455/41.2, 41.3, 412.1, 412.2, 414.1, 455/418, 420, 425, 517, 557, 569.1, 569.2, 455/575.9, 95, 99, 408, 566
See application file for complete search history.

(56) References Cited

U.S. PATENT DOCUMENTS

2006/0128370 A1* 6/2006 Tahara ........................ 455/420
2006/0220900 A1* 10/2006 Ceskutti et al. .......... 340/825.22
2008/0279562 A1* 11/2008 Naoe et al. .................... 398/140

(Continued)

FOREIGN PATENT DOCUMENTS

DE  2007 047 374  4/2008
EP  2093982 A1 *  8/2009  .......... H04M 1/2745

(Continued)

OTHER PUBLICATIONS

German Office Action for German Appl. No. 10 2011 084 529.1 dated Aug. 6, 2012.

*Primary Examiner* — Wesley Kim
*Assistant Examiner* — Dinh P Nguyen
(74) *Attorney, Agent, or Firm* — Finnegan, Henderson, Farabow, Garrett & Dunner, LLP

(57) ABSTRACT

An information processing apparatus includes a data storage portion that stores data records in which second data is associated with first data; a communicating portion that communicates with an external device; an updating portion that receives the data records from the external device and updates the data records; a screen controlling portion that displays one or more of the first data or the second data, and that receives a specifying operation specifying the first data; a determining portion that determines whether the information processing apparatus is in a state, in which control that uses the first data will be started in response to the screen controlling portion receiving the specifying operation; and a caching portion that caches the first data specified by the specifying operation separately from the data records stored in the data storage portion, when it is determined that the information processing apparatus is in the state.

14 Claims, 13 Drawing Sheets

(56) References Cited

U.S. PATENT DOCUMENTS

| | | | |
|---|---|---|---|
| 2008/0320398 A1* | 12/2008 | Ryu | 715/752 |
| 2009/0088205 A1* | 4/2009 | Tanaka et al. | 455/556.1 |
| 2010/0062714 A1* | 3/2010 | Ozaki | 455/41.3 |
| 2010/0076644 A1* | 3/2010 | Cahill et al. | 701/33 |
| 2010/0145764 A1* | 6/2010 | de Silva et al. | 705/10 |
| 2010/0151833 A1* | 6/2010 | Azuma et al. | 455/412.2 |

FOREIGN PATENT DOCUMENTS

| | | |
|---|---|---|
| JP | 7-274253 | 10/1995 |
| JP | 2006-67312 | 3/2006 |
| JP | 2008-309677 | 12/2008 |
| JP | 2009-81824 | 4/2009 |
| JP | 2009-118313 | 5/2009 |

* cited by examiner

FIG. 5A

| PHONEBOOK DATA | | |
|---|---|---|
| NAME | PHONE NUMBER | LINK TO IMAGE DATA |
| George Washington | 0565123456 | AAA.jpg |
| Abraham Lincoln | 0612340012 | BBB.jpg |
| | 09012345678 | |
| | 0812341111 | |
| | 0212347654 | CCC.jpg |
| Thomas Jefferson | 0471234223 | |

FIG. 5B

| CALL HISTORY DATA | | | | |
|---|---|---|---|---|
| PHONE NUMBER | TIME AND DATA | CALL HISTORY TYPE | | |
| 0312345678 | 2010/07/11 10:10 | OUT-GOING | | |
| 0612340000 | 2010/07/15 12:12 | | IN-COMING | |
| 0212340000 | 2010/07/21 15:34 | | | MISSED |
| 04712340000 | 2010/08/01 11:15 | | IN-COMING | |

INFORMATION PROCESSING APPARATUS, NAVIGATION SYSTEM, AND DATA UPDATING METHOD

INCORPORATION BY REFERENCE

The disclosure of Japanese Patent Application No. 2010-232860 filed on Oct. 15, 2010 including the specification, drawings and abstract is incorporated herein by reference in its entirety.

BACKGROUND OF THE INVENTION

1. Field of the Invention

The invention relates to an information processing apparatus that stores phonebook data, and the like. More particularly, the invention relates to an information processing apparatus, a navigation system, and a data updating method that control the relationship between updating phonebook data and updating a screen.

2. Description of Related Art

Given the fact that wireless communication between an on-board device and a mobile terminal is now possible, an occupant is now able to use a communication mode in which, in response to an operation by an occupant being received by the on-board device, the on-board device requests the mobile terminal to communicate with the outside according to the operation by the occupant. The occupant no longer needs to operate the mobile terminal, making it easier for him or her to concentrate on driving.

This wireless communication now further enables the on-board device to have a function in which it automatically transfers a phonebook in a mobile terminal from that mobile terminal. That is, when an occupant carrying a mobile terminal enters a range where communication with the on-board device is possible, the on-board device communicates with the mobile terminal and updates the phonebook on the on-board device side with the latest phonebook stored in the mobile terminal. Accordingly, when the occupant operates the on-board device, he or she is able to use the same phonebook as the phonebook that is in the mobile terminal.

However, if updating the phonebook takes time, the user may end up operating the on-board device while the phonebook is in the process of being updated. Until the update of the phonebook is complete, the on-board device will display the name and the like of a contact to the occupant using the phonebook before the update. Therefore, if the new and old phonebooks are switched upon completion of the update, the details of the operations performed thus far by the user may be initialized or operation by the user may be impeded.

For example, when the phonebook finishes being updated, the on-board device notifies the occupant by displaying "update complete" or the like, but if the on-board device switches the phone numbers and names displayed up until the end of the update to the phone numbers and names of the new phonebook as a result of the phonebook update after notifying the occupant that the update is complete, it may be annoying to the occupant.

Therefore, it is conceivable to update the phonebook when the occupant is not using the on-board device (see Japanese Patent Application Publication No. 2006-067312 (JP-A-2006-067312) and Japanese Patent Application Publication No. 2009-118313 (JP-A-2009-118313), for example). JP-A-2006-067312 describes a private branch exchanger that monitors the usage state of a phone, and delivers phonebook data to the phone when it is determined that the phone is not being used.

JP-A-2009-118313 describes an on-board hands-free apparatus that, when a mobile terminal receives a call while a phonebook is in the process of being updated, resumes updating the phonebook when the communication state changes to a communication state that is different from a receiving state.

However, if the phonebook is designed not to be updated while the phonebook is being used, as is the case with JP-A-2006-067312 and JP-A-2009-118313, the update of the phonebook will be delayed, which may result in problems such as the occupant not being able to select a phone number stored in the phonebook with the on-board device. Therefore, it is preferable that the phonebook be updated quickly.

Also, with regard to notification that the update is complete, if the notification itself is not made so as not to impede operation by the occupant, then there is no need to switch the displayed phone numbers around the time of the notification, but in this case, the occupant would not be able to know when the update is complete.

SUMMARY OF THE INVENTION

The invention thus provides an information processing apparatus, a navigation system, and a data updating method, that will neither impede operation by an occupant nor delay an update of a phonebook.

A first aspect of the invention is an information processing apparatus that includes a data storage portion that stores a plurality of data records in which second data is associated with first data; a communicating portion that communicates with an external device; an updating portion that receives the data records from the external device and updates the data records in the data storage portion; a screen controlling portion that displays, on a screen, one or more of the first data or the second data read from the data storage portion, and that receives a specifying operation specifying the first data; a determining portion that determines whether the information processing apparatus is in a state, in which control that uses the first data will be started in response to the screen controlling portion receiving the specifying operation; and a caching portion that caches the first data specified by the specifying operation separately from the data records stored in the data storage portion, when it is determined by the determining portion that the information processing apparatus is in the state.

A second aspect of the invention is a navigation system that includes the information processing apparatus according to the first aspect described above; a position detecting portion that detects a position of the navigation system; and a host position displaying portion that indicates the position of the navigation system on a map displayed on a screen.

A third aspect of the invention is a data updating method for an information processing apparatus that includes a data storage portion that stores a plurality of data records in which second data is associated with first data. This data updating method includes communicating with an external device; displaying one or more first data or second data read from the data storage portion on a screen and receiving a specifying operation that specifies the first data; determining whether the information processing apparatus is in a state, in which control that uses the first data will be started in response to receiving the specifying operation; caching the first data specified by the specifying operation separately from the data records stored in the data storage portion, when it is determined that the information processing apparatus is in the state; and receiving the data records from the external device and updating the data records in the data storage portion.

Accordingly, the invention is able to provide an information processing apparatus, a navigation system, and a data updating method, that will neither impede an operation by an occupant, nor delay an update of a phonebook.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 5A and 5B are examples of schematic diagrams for explaining a phonebook and call history data;

FIG. 9 is an example of a flowchart illustrating a routine by which the on-board device updates a phonebook and the like;

DETAILED DESCRIPTION OF EMBODIMENTS

Hereinafter, example embodiments of the invention will be described with reference to the accompanying drawings.

Figure 1:
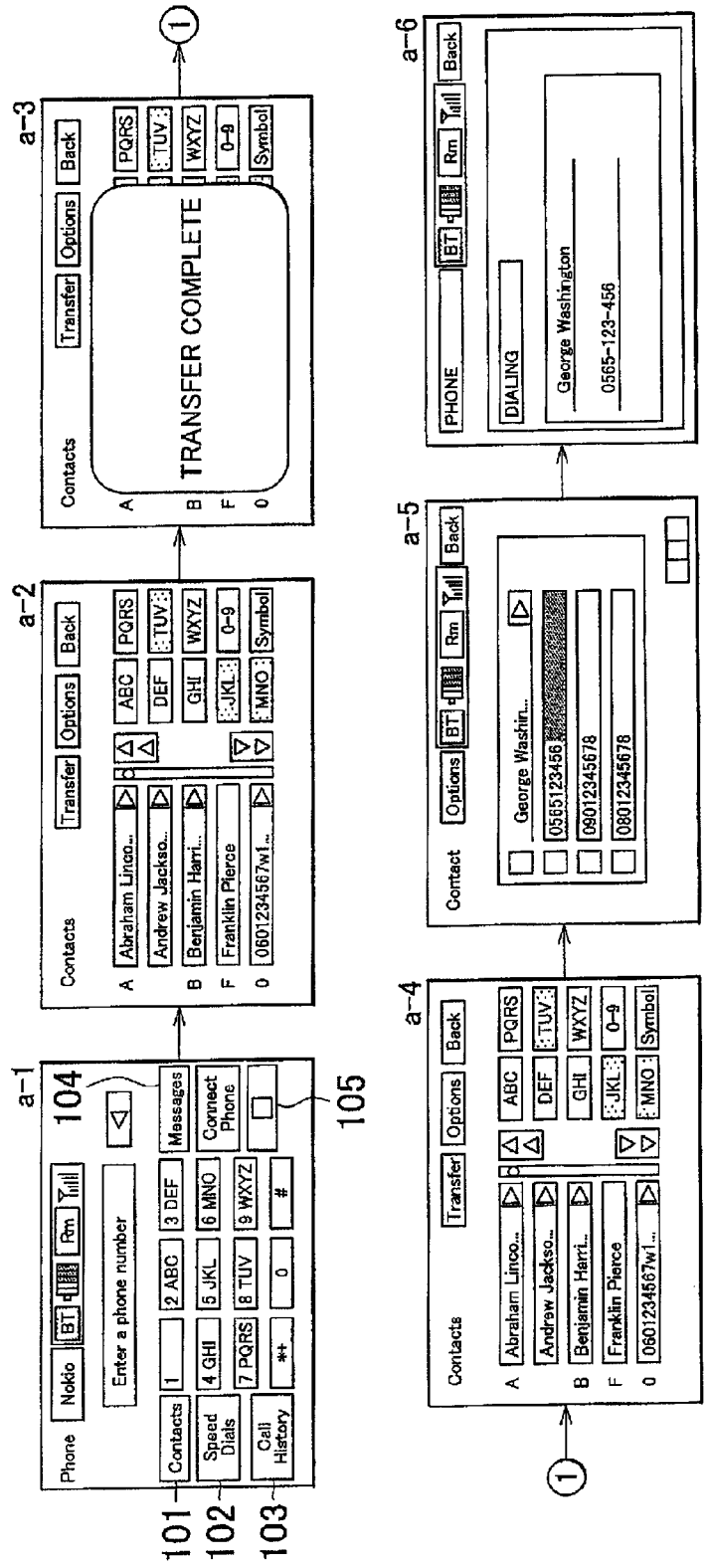
FIG. 1 is an example of a diagram of a transition example of screens provided by an on-board device (transition example 1)
Figure 2:
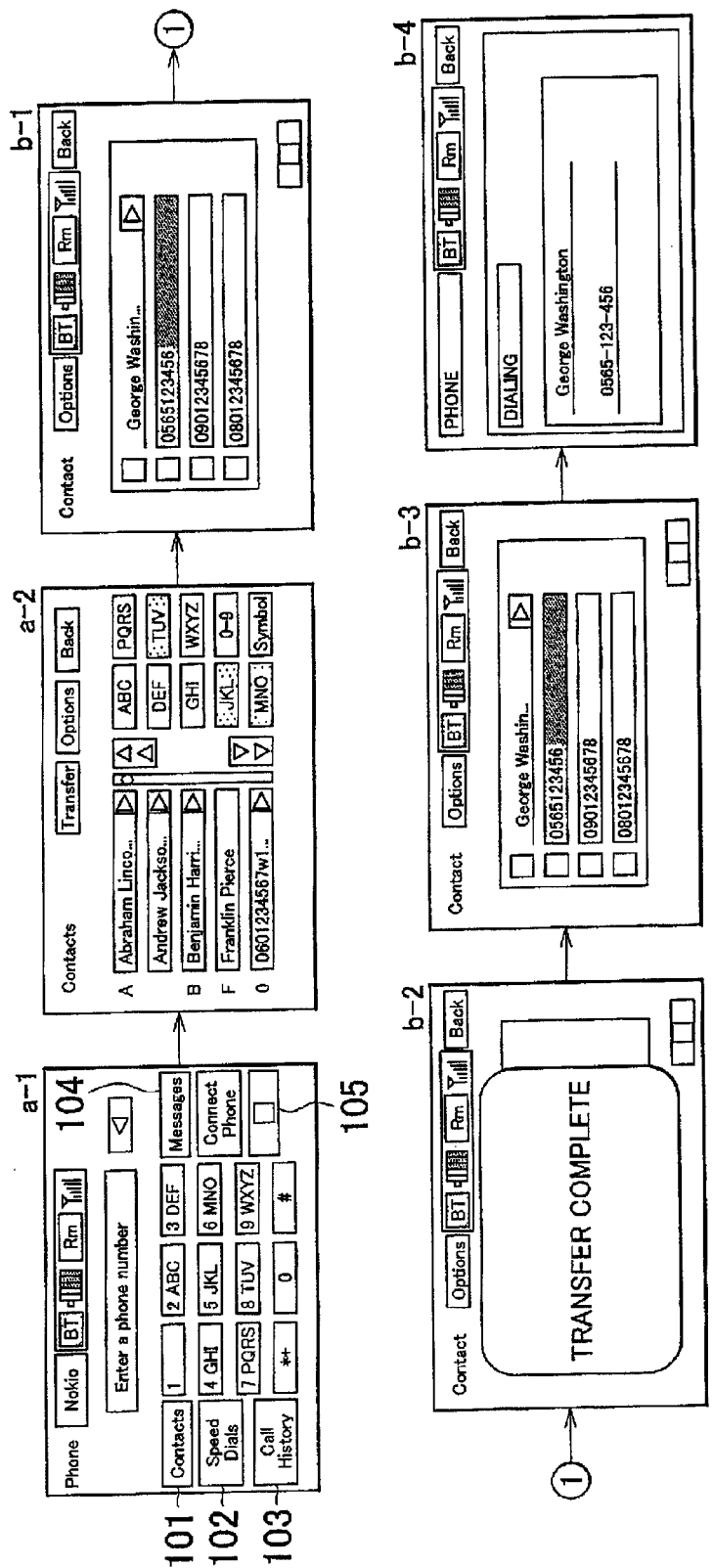
FIG. 2 is another example of a diagram of another transition example of screens provided in the on-board device (transition example 2)

FIG. 1 is an example of a diagram of a transition example of screens provided by an on-board device according to this example embodiment. FIG. 1 is a transition example of screens when the phonebook is updated by the time an occupant selects a phone number (transition example 1). FIG. 2 is a transition example of screens when a phonebook is updated after an occupant has selected a phone number (transition example 2), and shows a characteristic of the invention. An occupant in this example embodiment mainly refers to a driver, but also includes another occupant.

First, the on-board device communicates with a mobile terminal and starts to update the phonebook. During this time, the occupant operates the on-board device. The screen changes as shown in FIG. 1 or 2 according to the progress of the operation by the occupant and the progress of the update. An example of a transition of screens that shows a characteristic of this example embodiment is the transition example in FIG. 2.

Transition Example 1

The occupant switches to a list screen a-2 by pushing a Contacts button 101 in an enter a phone number screen a-1.

The occupant is then able to select a desired contact by scrolling through the list screen a-2 or the like.

If, before the occupant selects a contact, the phonebook finishes being updated while the list screen a-2 is being displayed, the on-board device displays a list screen a-3 in which a message of "Transfer complete" is displayed on the list screen a-2.

After displaying the message of the list screen a-3 for one to two seconds, the on-board device automatically switches to a list screen a-4. The list screen a-4 is a screen that is displayed based on the updated phonebook. For example, if the occupant had been scrolling in the list screen a-2, the on-board device will display the list screen a-4 with no scroll based on the updated phonebook. Also, even if there appears to be no difference between the list screen a-2 and the list screen a-4 because the occupant had not been scrolling in the list screen a-2, for example, the list screen a-4 will be displayed based on the updated phonebook.

In this way, if the phonebook finishes being updated before the occupant selects a contact, the on-board device will display a screen based on the updated phonebook when the update is complete.

Then, if the occupant selects a contact in the list screen a-4, a selected contact screen a-5, in which one contact has been selected will be displayed, and communication with the contact starts by the occupant pushing a Call button 105. Then the screen switches to a dialing screen a-6.

Transition Example 2

The enter a phone number screen a-1 and the list screen a-2 are displayed just as they are in FIG. 1. However, in FIG. 2, the occupant has scrolled through the list screen a-2 or the like and selected a desired contact before the phonebook has finished being updated. Therefore, the on-board device switches from the list screen a-2 to a selected contact screen b-1.

If the phonebook finishes being updated while the selected contact screen b-1 is being displayed, the on-board device displays a selected contact screen b-2 in which a message of "Transfer complete" is displayed on the selected contact screen b-1.

After displaying the selected contact screen b-2 for one to two seconds, the on-board device automatically switches to a selected contact screen b-3. This selected contact screen b-3 is a screen that is displayed based on the phonebook before the update. That is, there is absolutely no difference between the selected contact screen b-1 and the selected contact screen b-3. Even if the contact displayed in the selected contact screen b-1 that had been selected by the occupant is not registered in the updated phonebook, the on-board device will display the selected contact screen b-3 based on the phonebook before the update, so the contact selected by the occupant will still be displayed in the selected contact screen b-3.

Therefore, the occupant is able to call the contact in the selected contact screen b-3 without having to select the contact again or the like even if the phonebook finishes being updated.

That is, a screen design in which the on-board device displays the list screen a-2 (i.e., the screen is initialized) in response to the phonebook being updated if the on-board device does not keep displaying the selected contact screen b-3 is considered to be typical. In this case, however, the occupant would need to select the contact again. In contrast, in this example embodiment, the number of times the occupant operates the on-board device is able to be minimized by retaining the display of the selected contact.

Also, with a typical screen design, it is also possible that when the occupant has selected a contact, the display of the "Transfer complete" message would be suspended, even if the phonebook has finished being transferred, and the message would be displayed when an operation by the occupant is detected, and then the screen would return to a predetermined screen. However, in this case, unless the occupant performs an operation, the message may not be displayed for an extended period of time, so the occupant would not be able to know that the phonebook has been updated.

In this example embodiment, the occupant can be notified that the phonebook has been updated without waiting for an operation by the occupant to be detected, and operations by the occupant until that time will not be impeded.

Figure 3:
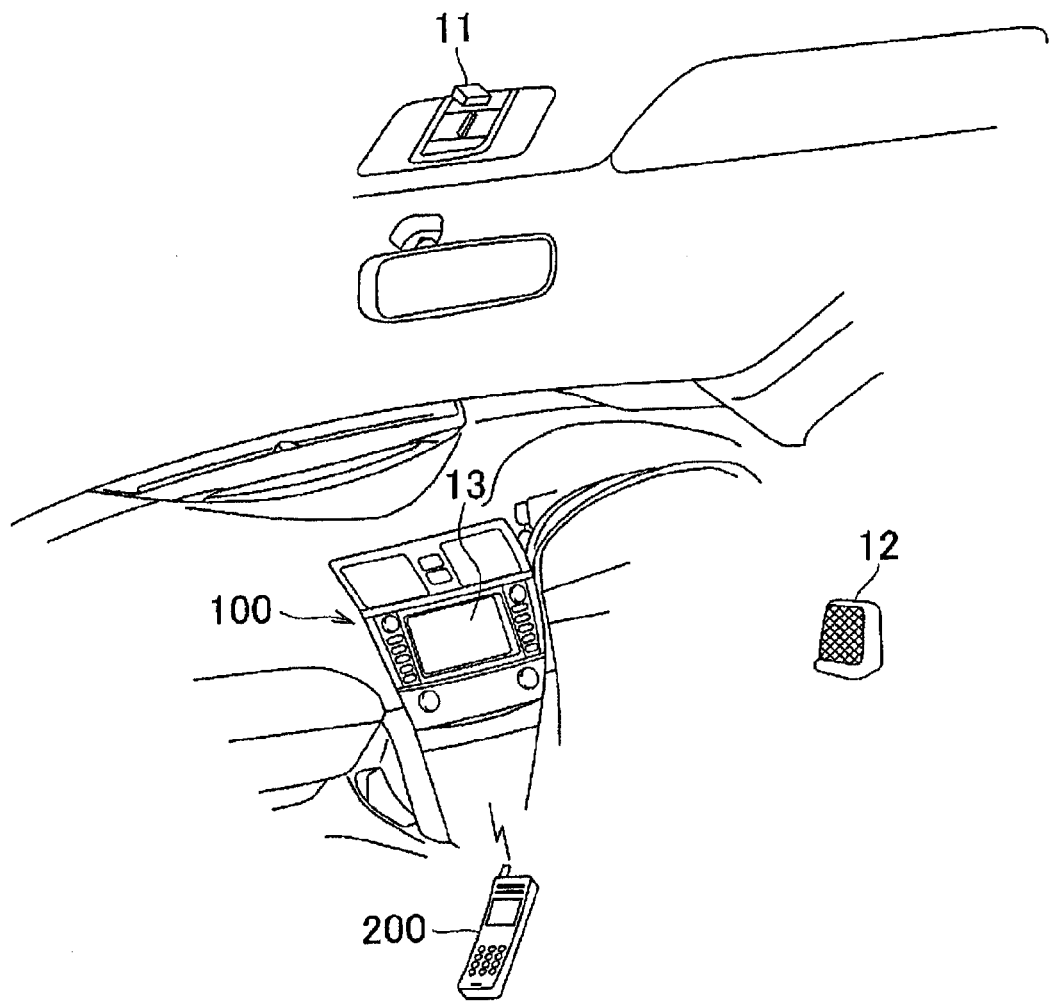
FIG. 3 is an example of a schematic diagram for explaining a system for wireless communication between the on-board device and a mobile terminal.

FIG. 3 is an example of a schematic diagram for explaining a system for wireless communication between an on-board device 100 and a mobile terminal 200.

The on-board device 100 is connected to a microphone 11 that picks up the voice of the occupant, and a speaker 12 that outputs the voice of the contact. Also, the on-board device 100 and the mobile terminal 200 preferably communicate wirelessly, and the voice data and the phonebook are able to be sent wirelessly from the on-board device 100 to the mobile terminal 200 or from the mobile terminal 200 to the on-board device 100. Also, the phonebook transfer method of this example embodiment is suitably used even if the on-board device 100 and the mobile terminal 200 are connected by a wire.

The on-board device 100 is an audio device, a navigation device, a visual device, or a device having a plurality of functions of these. The on-board device 100 as an audio device receives broadcasting radio waves, such as the television or the radio, and outputs the sound from the speaker 12, plays sound data stored on a CD or DVD and outputs the music from the speaker 12, or receives music data stored on the mobile terminal 200 and outputs the music from the speaker 12. The on-board device 100 as a navigation system uses map data and position information using Global Navigation Satellite System (GNSS), and displays a map and the position of the host vehicle on a display 13.

It is presumed that the on-board device 100 of this example embodiment transfers the phonebook to the on-board device 100 to assist the user with entering a contact in hands-free communication. The phone number and the like registered in the transferred phonebook is displayed on the display 13, so in this sense, the invention uses a visual device, and the voice of the call is output from the speaker 12, so in this sense, the invention uses an audio device.

The mobile terminal 200 may be applied to the phonebook transfer method of this example embodiment if there is a phonebook. However, the mobile terminal 200 that has the phonebook is typically capable of communication in a mobile communication system. The mobile terminal 200 is a mobile station in a mobile communication system, such as a mobile phone, a smartphone, or PHS, or the like, and is, capable of sending and receiving sound or data by wirelessly communicating with a mobile phone base station 24 on a wired network side. The mobile terminal 200 may support any communication standard, such as GSM, PDC, CDMA, and LTE, and the like. Also, calls such as IP calls are also possible with a communication standard for data communication only, such as WiMAX.

Figure 4:
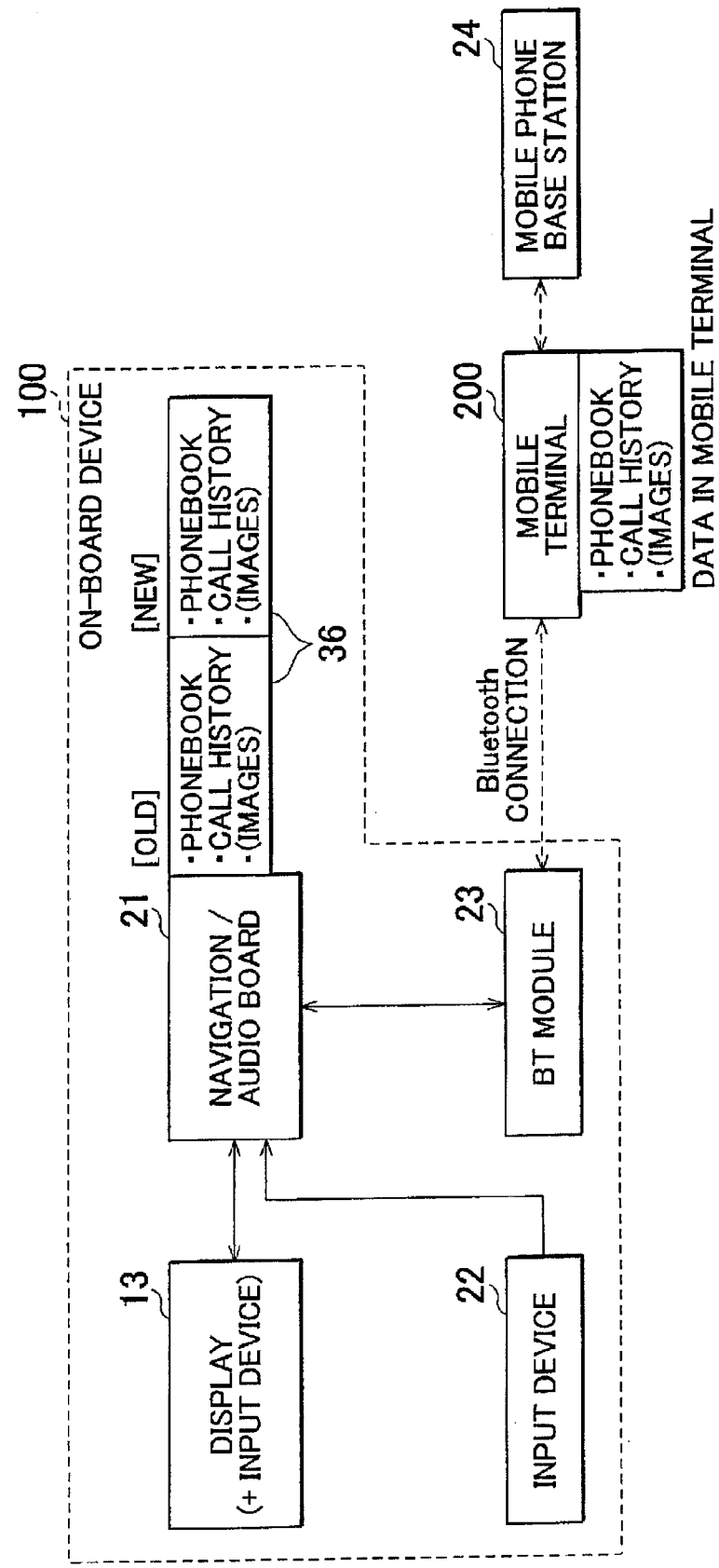
FIG. 4 is an example of a system configuration diagram of the on-board device and the mobile terminal.

FIG. 4 is an example of a system configuration diagram of the on-board device 100 and the mobile terminal 200. The on-board device 100 is controlled by a navigation/audio board 21. This navigation/audio board 21 is connected to the display 13, an input device 22, and a BT module 23.

The display 13 is such that a touch panel is integrally provided in a Flat Panel Display (FPD). A head-up display may also be provided. The input device 22 is a hard-key arranged around the display 13, a remote control, or a voice-input device (i.e., a voice recognition device). The occupant selects a contact or phone number by selecting a soft-key from a screen displayed on the display 13, for example. The occupant may also select a contact or phone number by operating the input device 22 and moving a cursor displayed on the display 13 over a soft-key on the screen and pushing an Enter button, or the like.

The BT module 23 communicates with the mobile terminal 200 according to a Near Field Communication standard such as Bluetooth (registered trademark). The mobile terminal 200 also has a BT module of the same communication standard. It should be noted that Bluetooth (registered trademark) is only an example. Any communication standard, such as ZigBee (registered trademark) or UWB (Ultra Wide Band) or the like, may be used.

Communication by this BT module 23 is well known and so will only be described briefly. When the BT module 23 first communicates with the mobile terminal 200, the occupant enters a PIN code (also referred to as a passkey), as directed by the on-board device 100, into the mobile terminal 200. The BT module 23 and the mobile terminal 200 search for each other's devices with the PIN code, and the BT module 23 creates a unique link key (not seen by the occupant) between the two devices, and transmits this link key to the mobile terminal 200 (referred to as "pairing"). The BT module 23 and the mobile terminal 200 store this link key, and once pairing is complete, the BT module 23 recognizes the mobile terminal 200 using this link key simply by the mobile terminal 200 entering the communication range of the BT module 23, after which communication is possible.

Bluetooth (registered trademark) formulates various profiles assuming different usages in order to ensure communication between various devices. In order for two devices to communicate with each other, the same profile must be implemented in both devices. Generic Access Profile (GAP), Service Discovery Application Profile (SDAP), and Serial Port Profile (SDP) and the like are basic profiles, and are implemented in the lower layer (on the hardware side). In this example embodiment, both the BT module 23 and the mobile terminal 200 have Phone Book Access Profile (PBAP) that transmits and receives a phonebook, in the upper layer of these common profiles. PBAP is a profile for the on-board device 100 to obtain the phonebook from the mobile terminal 200 without the occupant operating the mobile terminal 200.

Also, for hands-free communication, the BT module 23 and the mobile terminal 200 both preferably have Hands-Free Profile (HFP). HFP specifies voice input/output, the handling of an AT command, the transmission of signal strength and caller ID display and the like, the use of phonebook functions and redial, and echo cancellation and the like.

These profiles are implemented by an IC chip or a protocol stack (software), but they may also be included in the navigation/audio board instead of the BT module 23 due to development and cost limitations.

The navigation/audio board 21 is a computer in which a central processing unit (CPU), a read only memory (ROM), a random access memory (RAM), a non-volatile memory, an input/output interface, and an on-board local area network (LAN) communication device are connected together via a bus. The navigation/audio board 21 may also be replaced by a navigation electronic control unit (ECU) ( ), for example.

The non-volatile memory 36 is a hard disk drive (HDD) or flash memory, and stores the phonebook. In this example embodiment, a case is assumed in which the occupant is using the phonebook during an update, so capacity for two phonebooks, i.e., the old phonebook and the new phonebook, is necessary. Call history and images are often attached to the phonebook.

The old phonebook is the phonebook just before the phonebook is updated. The new phonebook is the phonebook that is newly sent from the mobile terminal 200. The new phonebook may be exactly the same as the old phonebook. FIG. 5A is an example of a schematic diagram for explaining a phonebook. The name, phone number, and a link to image data are able to be registered in the phonebook. Up to three (this number is only an example) phone numbers are able to be registered for each contact. In some cases, only the name or phone number is registered. Of course, the occupant will be unable to make a call if only the name is registered. Also, with a contact for which only a phone number is registered, the phone number will appear instead of the name on the screen where the name is supposed to be displayed on the display 13.

The link to image data is link data (such as a path name or a file name) for the on-board device 100 to link a photograph of the face of a friend or the like that is a contact with a name or phone number, and display it on the display 13. It is preferable that the information processing apparatus be configured so that the occupant can set the on-board device 100 or the mobile terminal 200 regarding whether or not the image data will be transferred from the mobile terminal 200 to the on-board device 100.

Also, call history is attached to the phonebook as a function of the mobile terminal 200. PBAP is also compatible with the transfer of the call history, so if there is a call history in the mobile terminal 200, the call history is transferred from the mobile terminal 200 to the on-board device 100 after the phonebook. FIG. 5B is an example of a schematic diagram for explaining call history. The phone number, time and date, and type of call history are all registered in the call history. The type of call history includes outgoing call history, incoming call history, and missed incoming call history. These pieces of identification information are registered according to the actual call history. It should also be noted that the call history may be stored in association with call history type, instead of associating the call history type with the phone number as shown in the drawing.

Figure 6:
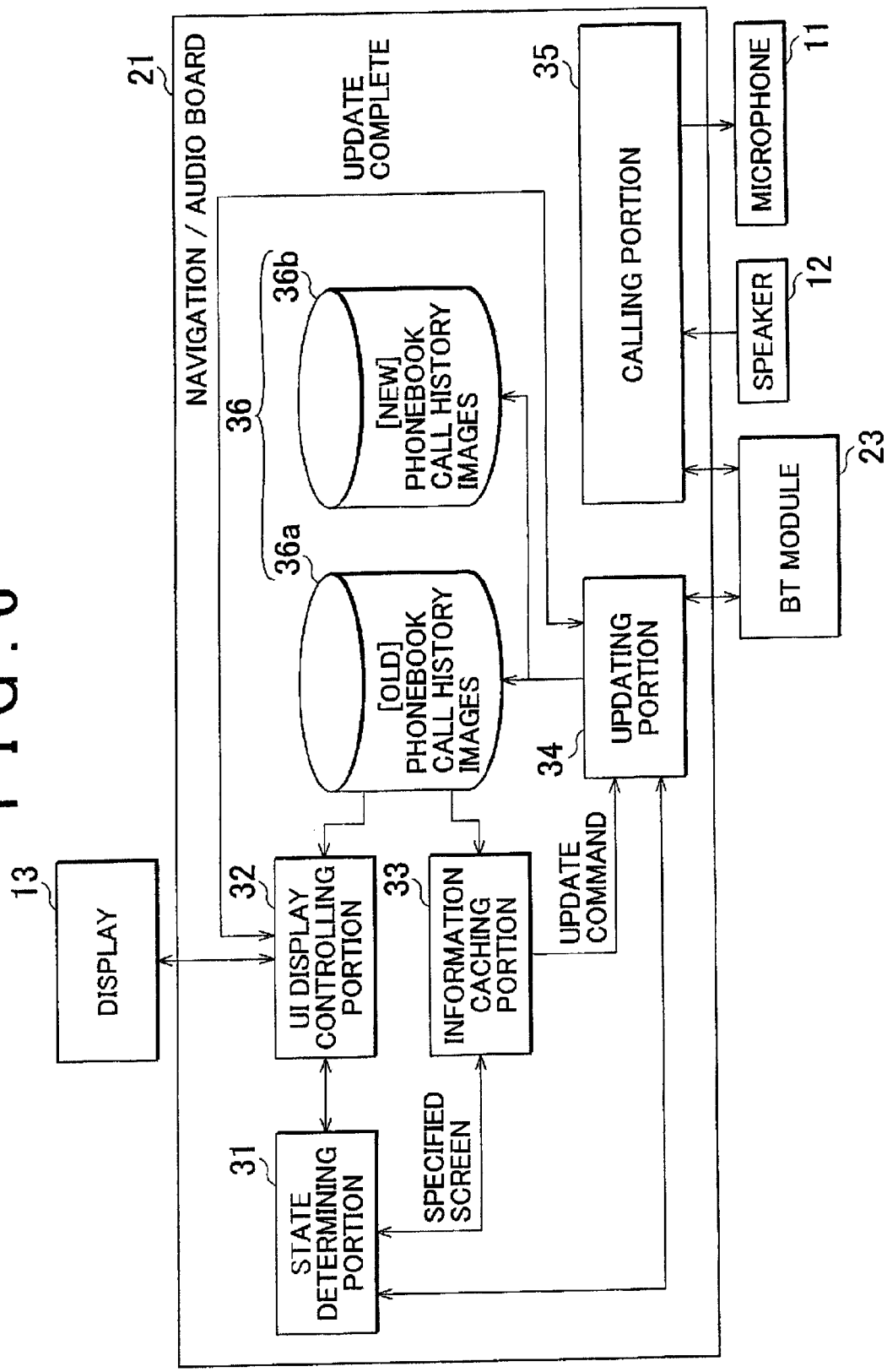
FIG. 6 is an example of a functional block diagram of a navigation/audio board.

FIG. 6 is an example of a functional block diagram of the navigation/audio board 21. The navigation/audio board 21 has a UI display controlling portion 32, a state determining portion 31, an information caching portion 33, an updating portion 34, and a calling portion 35. These functions are realized mainly by the CPU executing a program.

The UI display controlling portion 32 determines a screen to display on the display 13 based on preset screen configuration information, and displays the screen on the display 13. The screen configuration information is the display content of each screen and the information of screens that can be shown after a given screen. When an operation by the occupant with respect to the display 13 or an operation by the occupant via the input device 22 is detected, the UI display controlling portion 32 determines the next screen to display, reads the phonebook and the like, for example, to be displayed in that screen, and then displays the screen.

The updating portion 34 updates the old phonebook, call history, and images 36a stored in the navigation/audio board 21, with the new phonebook, call history, and images 361, received from the mobile terminal 200, with the BT module 23. The update generally goes through the following steps. S1: Storing the new phonebook, call history, and images 36b while keeping the old phonebook, call history, and images 36a. S2: Giving the old phonebook, call history, and images 36a an object name such as OLD, for example, and giving the new phonebook, call history, and images 36b an object name that is recognizable to the UI display controlling portion 32. S3: Deleting the files of the old phonebook, call history, and images 36a.

When the update process up to S1 is performed, the updating portion 34 notifies the UI display controlling portion 32 that the update is complete and stands by. Thereafter, the UI display controlling portion 32 is able to display an "update complete" message on the display 13 at any timing from S1 to S3.

The state determining portion 31 obtains the identification information of the screen displayed on the display 13 from the UI display controlling portion 32, and determines whether that screen is a preset screen (hereinafter referred to as a "specified screen"). The screens described below are examples of the specified screens.

{Selected Contact Screen, Call History Screen, Speed Dial Screen, and Messages Screen}

All of these are screens from which a call can be made to a contact, or from which e-mail can be sent. A specified screen is a screen that displays a phone number or a name that is associated with a phone number. With a specified screen, the content of the screen being displayed may change when the old phonebook, call history, or images 36a are updated. Therefore, the manufacturer of the on-board device specifies the specified screens. When the state determining portion 31 determines that a screen being displayed is a specified screen, the state determining portion 31 notifies the information caching portion 33.

The information caching portion 33 caches information necessary for maintaining the specified screen, and information necessary to make a call or send a message via e-mail.

After the updating portion 34 has executed the update up to S1 described above, S2 and S3 may be completed, so the old phonebook, call history, and images 36a may no longer be able to be accessed. Therefore, the information caching portion 33 caches the necessary information to enable a specified screen or a screen that is to be shown in order to make a call to be displayed, even if the old phonebook, call history, and images 36a are unable to be accessed. This kind of cache information will be described later.

Also, the updating portion 34 is placed on standby so that it will not proceed with the processes of S2 and S3 until the information has finished being cached. When the information caching portion 33 finishes caching, the information caching portion 33 directs the updating portion 34 to proceed with the processes of S2 and S3. Consequently, the updating portion 34 executes the processes of S2 and S3.

Also, when the state determining portion 31 receives a cancel operation set for each specified screen from the UI display controlling portion 32, the state determining portion 31 detects that the UI display controlling portion 32 has become able to display the new phonebook, call history, and images 36b, and that caching has become unnecessary, and then notifies the UI display controlling portion 32 and the information caching portion 33.

When the UI display controlling portion 32 switches screens, the UI display controlling portion 32 reads the phone numbers, names, and images from the new phonebook, call history, and images 36b after the update, so the updated results are able to be reflected in the screen. Also, the information caching portion 33 discards the cached information.

The calling portion 35 cooperates with the BT module 23. When the occupant selects a name or phone number displayed on the display 13, that phone number is consequently directed to the BT module 23. The BT module 23 communicates with the mobile terminal 200 according to HFP, and sends the mobile terminal 200 the phone number or AT command, thereby enabling the mobile terminal 200 to call the contact.

Also, when the mobile terminal 200 receives a call, the mobile terminal 200 communicates with the BT module 23 according to HFP, and notifies the calling portion 35 of the phone number of the caller. The calling portion 35 then notifies the UI display controlling portion 32 of the phone number. The UI display controlling portion 32 then searches the phonebook for that phone number, and if the phone number is in the phonebook, the UI display controlling portion 32 displays the name of the caller (and phone number) read from the phonebook superimposed on the screen (such as a navigation screen or a television screen, for example) being displayed on the display 13. The calling portion 35 stops sound that is being output from the speaker 12 and outputs a ringtone, thus enabling the occupant to know that there is a call. If the name of the caller is not in the phonebook stored in the non-volatile memory 36, the calling portion 35 displays the phone number of the caller on the display 13.

An off hook button for responding to an incoming call is displayed on the screen where the name or phone number is displayed, so when the occupant pushes the off hook button, the occupant and the contact are able to talk via the BT module 23 and the mobile terminal 200.

The voice generated by the occupant is picked up by the microphone 11 and converted into an electric signal, which the calling portion 35 then sends to the BT module 23. The BT module 23 then sends this voice information to the mobile terminal 200. The mobile terminal 200 sends the received voice information to the contact in a predetermined format. Also, the voice information from the contact is sent by the mobile terminal 200 to the BT module 23 of the on-board device 100, and the BT module 23 then sends it to the calling portion 35. The calling portion 35 then converts the voice information into an electric signal, which is then output from the speaker 12.

Next, screen examples and cancel operations for each specified screen will now be described. The occupant is able to make a call in one of the following four ways: (i) Directly entering the number; (ii) Making a selection from the phonebook; Making a selection from call history; and (iv) Making a selection from the speed dial screen. Three of these (i.e., (ii) to (iv)) are specified screens.

<Selected Contact Screen>

Figure 7A:
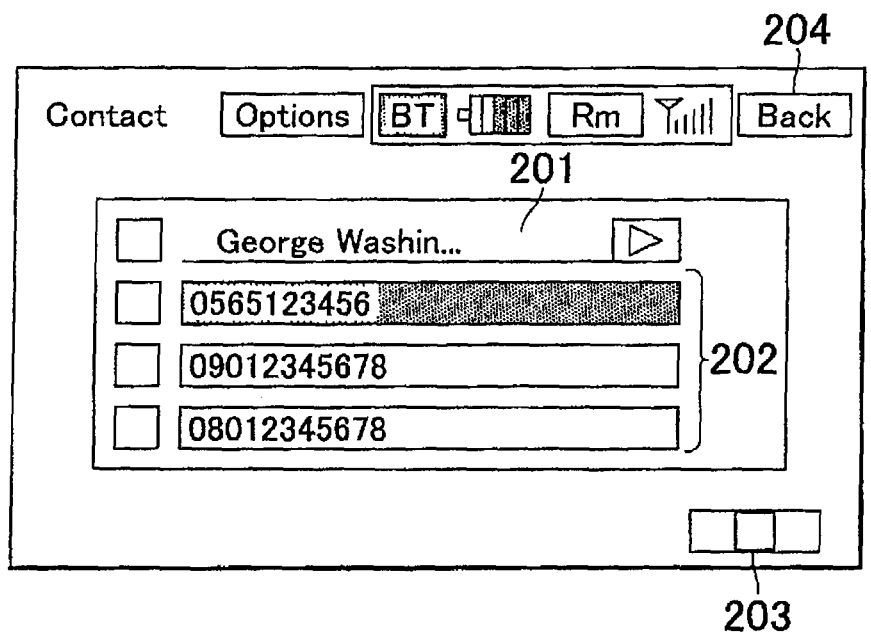
FIGS. 7A and 7B are diagrams of examples of a selected contact screen and a call history screen.

FIG. 7A is a diagram of an example of a selected contact screen. When the occupant selects one contact (name) from the list screen, the UI display controlling portion 32 reads up to three phone numbers associated with the name from the phonebook, and displays the selected contact screen.

The selected contact screen has a name column 201, a phone number column 202, a Back button 204, and a Call button 203. When the occupant selects one of the phone numbers in the phone number column 202 or pushes the Call button 203, the UI display controlling portion 32 receives this selection, and sends the phone number to the calling portion 35 and requests call control. As a result, the occupant is able to talk with the contact hands-free. It should be noted that the occupant may also make a call with a voice operation using voice recognition instead of by touching the display 13.

In the selected contact screen, the occupant has already selected the contact, as described above, so if the phone number is updated in this state, the link between the selected contact and the phonebook may be lost and the occupant may no longer be able to make the call. Also, when a phonebook list is displayed in order to avoid this, the occupant is forced to select the contact again, which is not preferable. Therefore, the selected contact screen is a specified screen.

Also, the cache information of the selected contact screen is a name and phone number (up to three each) displayed in the selected contact screen. With this information, the UI display controlling portion 32 is able to display the screen while dialing or during a call.

The selected contact screen is canceled (i.e., a cancel operation is performed) by doing one of the following.
Ending a call (hanging up)
Pushing the Back button 204

When the occupant ends a call, it is thought that the contact selected by the occupant has fulfilled its part, so updating the phonebook will not cause any problems. The same is also true if the contact hangs up first. Also, if the user has pushed the Back button 204 in the selected contact screen, it is thought that the occupant has cancelled the selection of the contact, so it is up to the discretion of the occupant as to whether to select the same contact again after the phonebook has been updated.

Therefore, when a call has been ended or the Back button 204 has been pushed, the state determining portion 31 notifies the UI display controlling portion 32 and the information caching portion 33 that a cancel operation has been detected.

<Call History Screen>

Figure 7B:
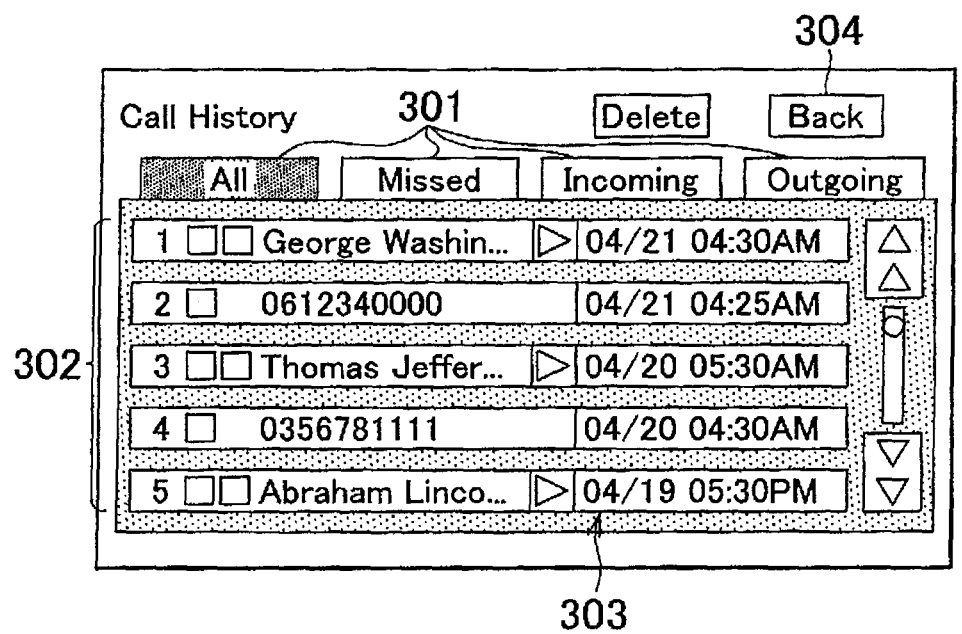

FIG. 7B is a diagram of an example of a call history screen. If the occupant pushes a Call History button 103 in a screen to select one contact (name) from the phonebook (see FIGS. 1 and 2), the UI display controlling portion 32 displays the call history screen shown in FIG. 7B. That is, the UI display controlling portion 32 reads the phone number from the call history, and reads the name associated with the phone number from the phonebook.

In the call history screen in FIG. 7B, the call history type displayed on the display 13 is divided by tabs 301. The "All" tab is a tab that displays all call history types, the "Missed" tab is a tab that displays the call history of missed calls, the "Incoming" tab is a tab that displays the call history of all received calls, and the "Outgoing" tab is a tab that displays the call history of calls that have been made.

A name column 302, a time and date column 303, and a Back button 304 and the like are displayed in the call history screen. A name is generally displayed in the name column 302, but if a phone number read from the call history by the UI display controlling portion 32 is not registered in the phonebook, or if a phone number is registered in the phonebook but a name is not, the phone number is displayed in the name column 302. The call history is sorted in order of time and date or in alphabetical order (by name) for each tab, and displayed in the call history screen.

For the call history screen as well, if the call history is updated when the call history screen is being displayed, the link between the call history being displayed and the call history data that is stored may be lost and the occupant may no longer be able to make the call. If the UI display controlling portion 32 displays the call history screen again or switches the tab being displayed to a tab of the default setting (such as the "All" tab) to avoid this, it may annoy the user. Therefore, the call history screen is a specified screen.

Also, the cache information of the call history screen is the phone numbers and names of all of the contacts (including those that have not yet been scrolled through) displayed by the current tab 301. With this information, the UI display controlling portion 32 is able to maintain the call history screen, scroll, and display the screen while dialing or during a call.

The call history screen is cancelled (i.e., a cancel operation is performed) by doing one of the following.

Pushing the Back button 304

Selecting another tab

If the user pushes the Back button 304 in the call history screen, the call history will no longer be displayed, so it will not be a problem if the link between the call history and the name or the like in the call history screen is lost. Also, if the user selects another tab from the tabs being displayed in the call history screen, the call history will temporarily not be displayed, so it will not be a problem if the link between the call history and a name or the like in the call history screen is temporarily lost.

Therefore, if the Back button is pushed, or if another tab is selected, the state determining portion 31 notifies the UI display controlling portion 32 and the information caching portion 33 that a cancel operation has been detected.

<Speed Dial Screen>

Figure 8A:
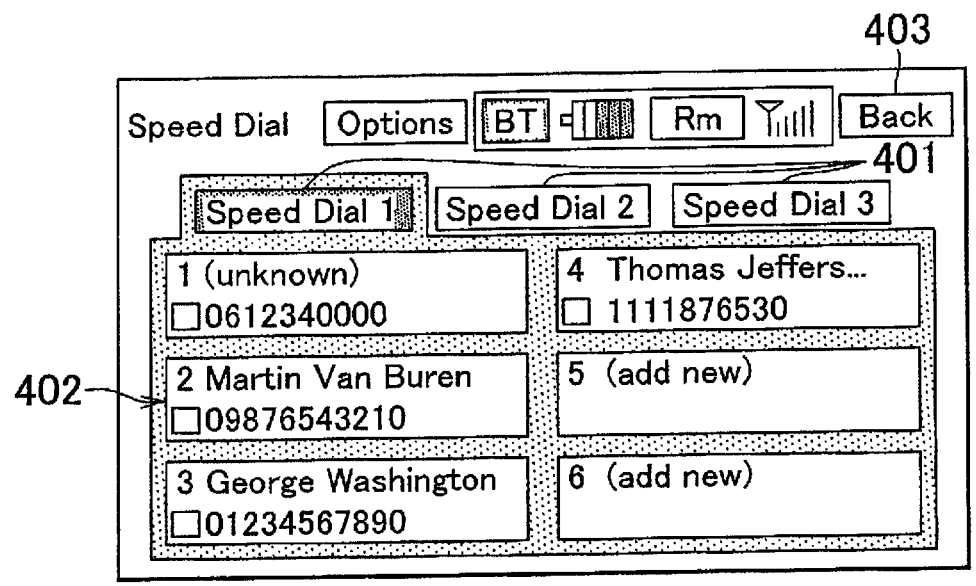
FIGS. 8A and 8B are diagrams of examples of a speed dial screen and a messages screen.

FIG. 8A is a diagram of an example of a speed dial screen. First, the speed dial screen will be described. The speed dial screen is a screen for making a call, and is provided so that the occupant can select a contact by fewer operations, without having to select the contact from the phonebook or the call history.

The contact displayed in the speed dial screen can be registered manually by the occupant. There are a variety of methods for registering a contact. For example, one method involves having the occupant operate the display 13 to display a registration screen for selecting a contact to be displayed in the speed dial screen, and then having the occupant select a contact, one at a time, from the phonebook, and registering the selected contact in a list in the speed dial screen.

Only the phone number will be registered in the list in the speed dial screen. This is because after a list in the speed dial screen has been created, this list in the speed dial screen is managed separately from the phonebook, so if a name is also registered in the list in the speed dial screen, variance may occur between the matching of the name to the phone number in the phonebook, and the matching of the name to the phone number in the list in the speed dial screen. Therefore, the UI display controlling portion 32 registers only the phone number in the list of the speed dial screen, and reads the name associated with the phone number from the phonebook and displays it in the speed dial screen.

If the occupant pushes a Speed Dials button 102 from the enter a phone number screen, the UI display controlling portion 32 displays the speed dial screen shown in FIG. 8A. That is, the UI display controlling portion 32 reads the phone number from the list in the speed dial screen, and reads the name associated with the phone number from the phonebook. If a name associated with a phone number is not registered in the phonebook, then the UI display controlling portion 32 displays "Unknown", for example, as the name.

Tabs 401, a name and phone number column 402, and a Back button 403 and the like are displayed in the speed dial screen. Names and phone numbers are generally displayed in the name and phone number column 402, but if a phone number read from the list by the UI display controlling portion 32 is not registered in the phonebook, or if a phone number is registered in the phonebook but a name is not, the phone number is displayed in the name and phone number column.

In the speed dial screen shown in FIG. 8A, contacts displayed on the display 13 at a time are divided into three groups (Speed Dial 1 to 3) by the tabs 401. Each tab for Speed Dial 1 to 3 displays the first to sixth, seventh to twelfth, and thirteenth to eighteenth contacts, respectively, in order from the most often used, in the order registered, or in alphabetical order.

With the speed dial screen as well, if the phonebook is updated while the speed dial screen is being displayed, the link between the contact being displayed and the phonebook may be lost and the occupant may no longer be able to make the call. If the UI display controlling portion 32 displays the speed dial screen again or changes the tab 401 being displayed to a tab of the default setting (such as "Speed Dial 1") to avoid this, it may annoy the occupant. Therefore, the speed dial screen is a specified screen.

Also, the cache information of the speed dial screen is the phone numbers and names of all (up to six) of the contacts displayed by the current tab 401. With this information, the UI display controlling portion 32 is able to display the screen while dialing or during a call.

The speed dial screen is cancelled (i.e., a cancel operation is performed) by doing one of the following.

Pushing the Back button 403

Selecting another tab

If the user pushes the Back button 403 in the speed dial screen, the contact will no longer be displayed, so it will not be a problem if the link between the contact and the phonebook is lost. Also, if the user selects another tab from the tabs being displayed in the speed dial screen, the contact will temporarily not be displayed, so it will not be a problem if the link between the contact and the phonebook is temporarily lost.

Therefore, if the Back button 401 is pushed, or if another tab is selected, the state determining portion 31 notifies the UI display controlling portion 32 and the information caching portion 33 that a cancel operation has been detected.

<Messages Screen>

Figure 8B:
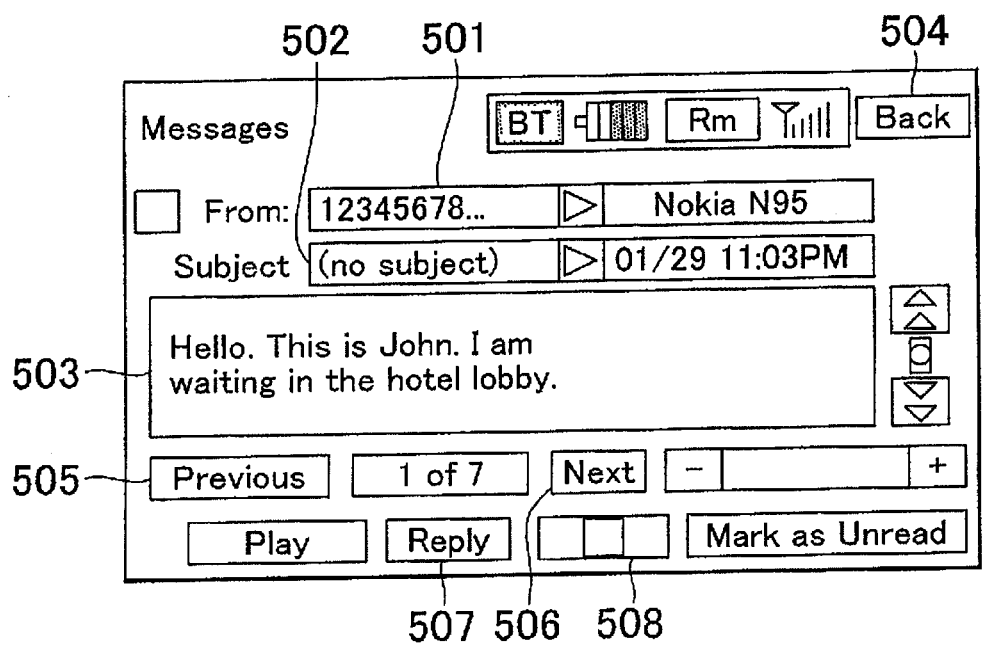

FIG. 8B is a diagram of an example of a messages screen. The mobile terminal 200 is able to send and receive messages from a short message service (SMS), in addition to sending and receiving e-mail sent to an e-mail address. SMS is directed to a phone number, so in this example embodiment, a case in which a message is sent and received by SMS will be described. However, the same may also be applied to the case of e-mail.

The mobile terminal 200 stores a SMS received history and a SMS sent history just like the call history. Also, Bluetooth is designed with a profile (MAP: Message Access Profile) that transfers SMS and e-mail between devices. If the BT module 23 and the mobile terminal 200 have MAP, a newly received SMS by the mobile terminal 200 is able to be transferred to the on-board device 100. Also, the SMS received history and the SMS sent history of the mobile terminal 200 can be transferred to the on-board device 100 by MAP.

When the occupant selects a Messages button 104 in the enter a phone number screen, the UI display controlling portion 32 reads the message from an inbox and displays the messages screen.

The messages screen has a sender column 501, a title column 502, a message body column 503, a Back button 504, a Previous button 505, a Next button 506, a Reply button 507, and a Send button 508. The UI display controlling portion 32 reads the name associated with the phone number read from the inbox from the phonebook, and displays it in the sender column 501 (in the drawing, no name is registered, so only the Phone number appears).

The Back button 504 is a button for escaping out of the messages screen and displaying the enter a phone number screen. The Previous button 505 is a button for displaying the one previous SMS (an SMS with an older received time and date) with the messages screen as it is. The Next button 506 is a button for displaying the one next SMS (an SMS with a more recent received time and date) with the messages screen as it is. The Reply button 507 is a button for displaying an SMS edit screen in which the occupant creates a message to send a reply SMS to the sender. Also, the Send button 508 is a button for making a voice call to the sender.

With the messages screen as well, if the phonebook is updated when the messages screen is being displayed, the link between the sender being displayed and the phonebook may be lost and the occupant may no longer be able to reply. If the UI display controlling portion 32 displays the messages screen for a different message in order to avoid this, the user must make the selection again, operability may decrease, and it may annoy the user. Therefore, the messages screen is a specified screen.

Also, the cache information of the messages screen is all of the information being displayed in the current messages screen (e.g., the name in the sender column 501, the phone number in the phonebook that is associated with the name, the title in the title column 502, and the message body in the message body column 503, and the like). With this information, the UI display controlling portion 32 is able to display the screen for a reply (i.e., the edit screen), reply, and make a call.

The messages screen is canceled (i.e., a cancel operation is performed) by doing one of the following.
Pushing the Back button 504
Pushing the Previous button 505 or the Next button 506
Pushing the Reply button 507→Reply finished
Ending a call If the occupant pushes the Back button 504 in the messages screen, the sender will no longer be displayed, so it will not be a problem if the link between the sender and, a phonebook is lost. Also, if the occupant pushes the Previous button 505 or the Next button 506 such that another message is displayed, the sender will temporarily not be displayed, so it will not be a problem if the link between the sender and a phonebook is temporarily lost. Also, if the occupant finishes replying by pushing the Reply button 507, the operation related to the sender selected by the occupant is finished, so operation by the occupant will not be affected if the phonebook is updated.

Therefore, if the Back button 504 is pushed, if the Previous button 505 or the Next button 506 is pushed, if a reply is finished, or if a call is ended, the state determining portion 31 notifies the UI display controlling portion 32 and the information caching portion 33 that a cancel operation has been detected.

(Operation Routine)

Figure 9:
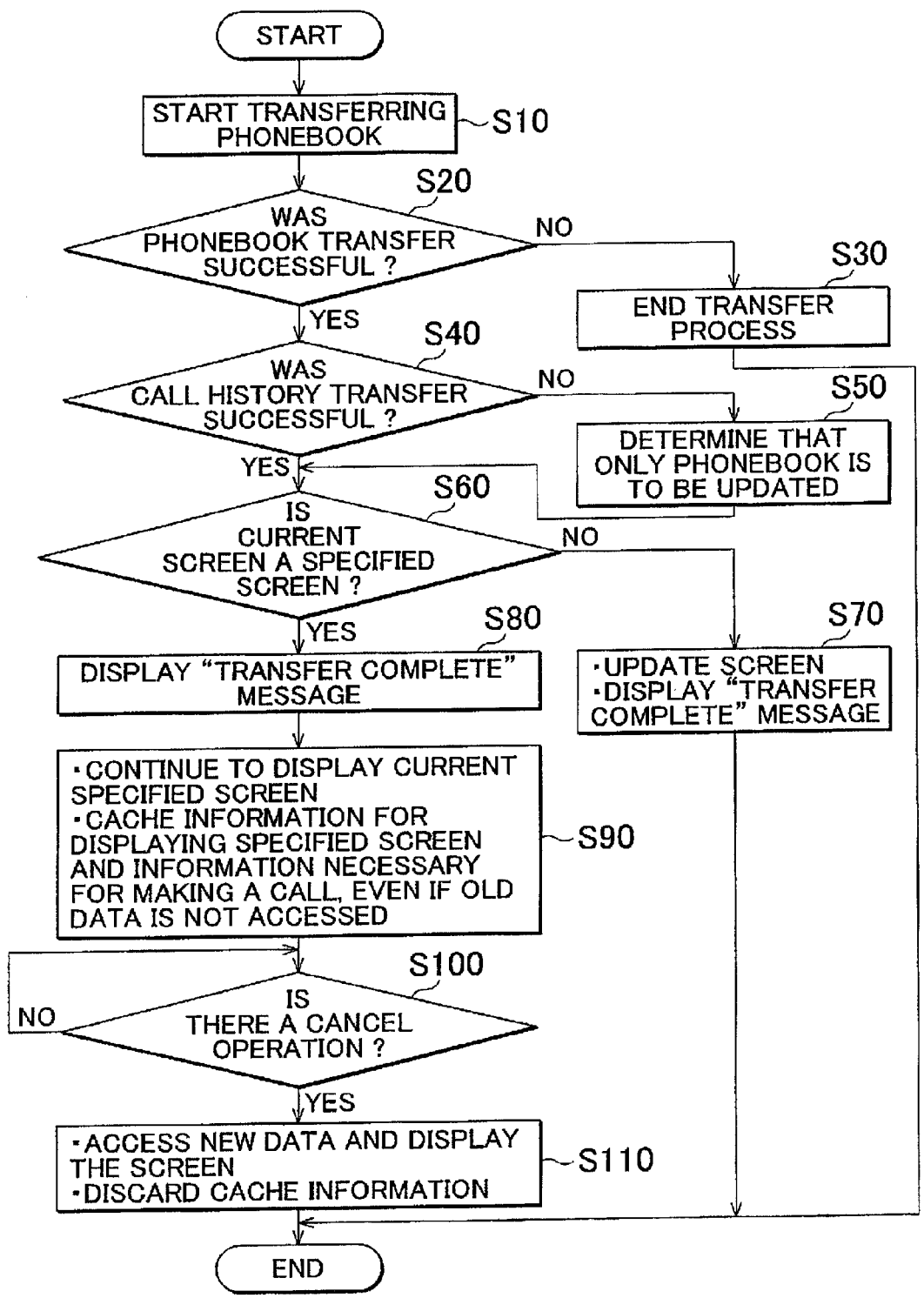

FIG. 9 is an example of a flowchart showing a routine by which the on-board device 100 of the example embodiment updates the phonebook and the like. The routine in FIG. 9 starts when the BT module 23 starts to communicate with the mobile terminal 200, for example.

The updating portion 34 starts to receive the phonebook from the mobile terminal 200 by PBAP (S10). PBAP and HFP are both simultaneously active in parallel, so a call can be made while the phonebook is being transferred.

The updating portion 34 determines whether the phonebook has been successfully received (i.e., whether the process in S10 is successful) (S20). The phonebook is considered to have been successfully received when a call is not interrupted and no errors are detected according to a parity check or the like.

If the phonebook has not been successfully received (i.e., No in S20), the updating portion 34 ends the transfer process (S30). In this case, the received phonebook is discarded.

If the phonebook has been successfully received (i.e., Yes in S20), the updating portion 34 determines whether the call history has been successfully transferred (S40). The method for determining whether the transfer has been successful is the same as that for the phonebook. Thereafter, the updating portion 34 receives images and SMS messages and the like as necessary.

If the call history has not been successfully received (i.e., No in S40), the updating portion 34 determines that only the phonebook is to be updated (S50).

If the call history has been successfully received (i.e., Yes in S40), the state determining portion 31 determines whether the current screen is a specified screen (S60). The state determining portion 31 obtains the identification information of the current screen from the UI display controlling portion 32, and determines whether it matches with the identification information of a specified screen registered in advance.

If the current screen is not a specified screen (i.e., No in S60), the updating portion 34 continues the processes of S2 and S3 described above, completes the update, and notifies the UI display controlling portion 32 that the update is complete, such that the UI display controlling portion 32 updates the screen (S70). For example, when the list screen is displayed on the display 13, the UI display controlling portion 32 rewrites the contacts and the like on the list screen. If the screen is scrolling, it will be displayed from the top of the contacts. Also, the screen will return from the screen currently displayed on the display 13 to one previous screen as necessary.

The UI display controlling portion 32 displays the "Transfer complete" message on the display 13 (S70, S80). Therefore, the user can be made aware early on that the phonebook has been transferred.

If the screen is a specified screen (i.e., Yes in S60), the state determining portion 31 sends a request to the UI display controlling portion 32 to continue to display the current screen (S90).

Also, the state determining portion 31 notifies the information caching portion 33 to cache the information necessary to display screens that may be displayed until a cancel operation is detected and information for displaying a specified screen without accessing the old data. After caching, the information caching portion 33 notifies the updating portion 34 that caching is complete, so the updating portion 34 continues the processes of S2 and S3 described above, completes the update, and notifies the UI display controlling portion 32 that the update is complete.

Next, the state determining portion 31 determines whether a cancel operation has been performed (S100). If a cancel operation has not been performed (i.e., No in S100), the UI display controlling portion 32 displays a specified screen or an outgoing calls screen or the like.

Also, if there is a cancel operation (i.e., Yes in S100), the UI display controlling portion 32 updates the screen with the new phonebook and the like (S110). Also, the information caching portion 33 discards the cached information.

(Example of Screen Transition)

Figure 10:
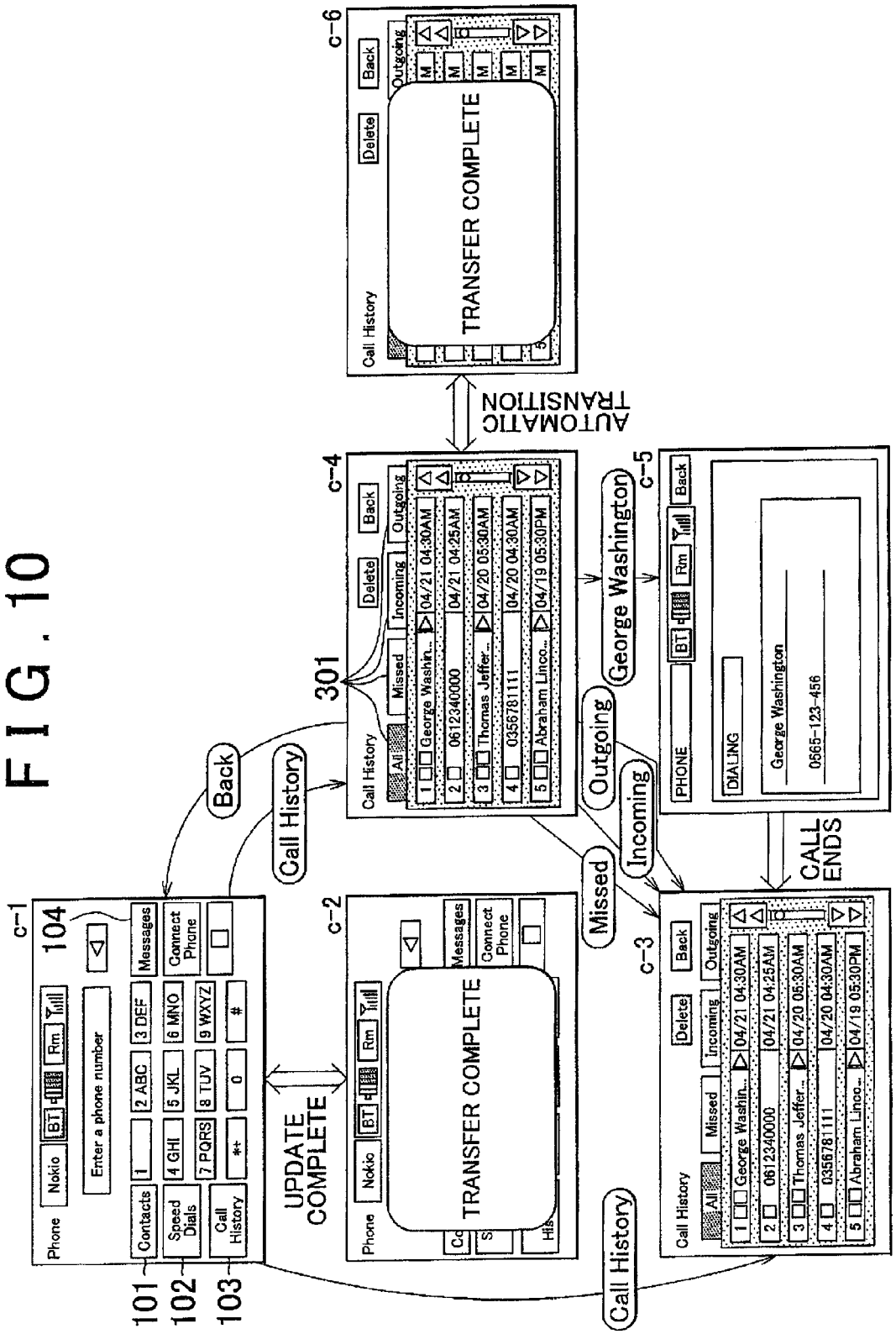
FIG. 10 is an example of a transition example of screens and a phonebook update in a call history screen.

FIG. 10 is an example of a transition example of screens and a phonebook update in a call history screen.

First, a case in which an update does not affect the screen transition will be described.

The occupant makes the enter a phone number screen c-1 displayed.

If the phonebook finishes being updated while the enter a phone number screen c-1 is being displayed, the enter a phone number screen c-2, in which the message "Transfer complete" is displayed, is displayed. After several seconds, the screen will switch back to the enter a phone number screen c-1 with no message.

If the occupant pushes a Call History button 103 in the enter a phone number screen c-1, the call history screen c-3 will be displayed.

Next, a case in which an update affects the screen transition will be described.

The occupant makes the enter a phone number screen c-1 displayed.

If the occupant pushes the Call History button 103 while the enter a phone number screen c-1 is being displayed before the phonebook has finished being updated, the call history screen c-4 is displayed.

If the phonebook finishes being updated while the call history screen c-4 is displayed, the call history screen c-6, in which the message "Transfer complete" is displayed, is displayed. After several seconds, the screen will switch back to the call history screen c-4 with no message.

In the call history screen c-4, the information necessary to display this call history screen c-4 and the information necessary to display the active call screen c-5 axe cashed, e.g., the name "George Washington" in the call history before the update, and the phone number associated with "George Washington" in the phonebook.

If the occupant pushes a contact (for example, George Washington) from the call history screen c-4, the active call screen c-5 will be displayed.

The name (if in the phonebook) and phone number cached in the call history screen c-4 are displayed in the active call screen c-5. If the update finishes after a call has started, a message is displayed in the active call screen c-5.

When the call ends, the call history screen c-3 is displayed. The phonebook update is reflected in the call history screen c-3. Therefore, "Franklin Roosevelt" is newly displayed as a name that had not been displayed in the call history screen c-4, for example.

The call history screen c-3 is also displayed when the occupant switches tabs 301 (i.e., the Missed tab, the Incoming tab, the Outgoing tab) without making a call in the call history screen c-4 (it is assumed that the phonebook has already been transferred). In this case, the tab 301 is switched, so "Franklin Roosevelt" will not be displayed as shown in the drawing, but the name and phone number will be displayed based on the call history after the update.

Figure 11:
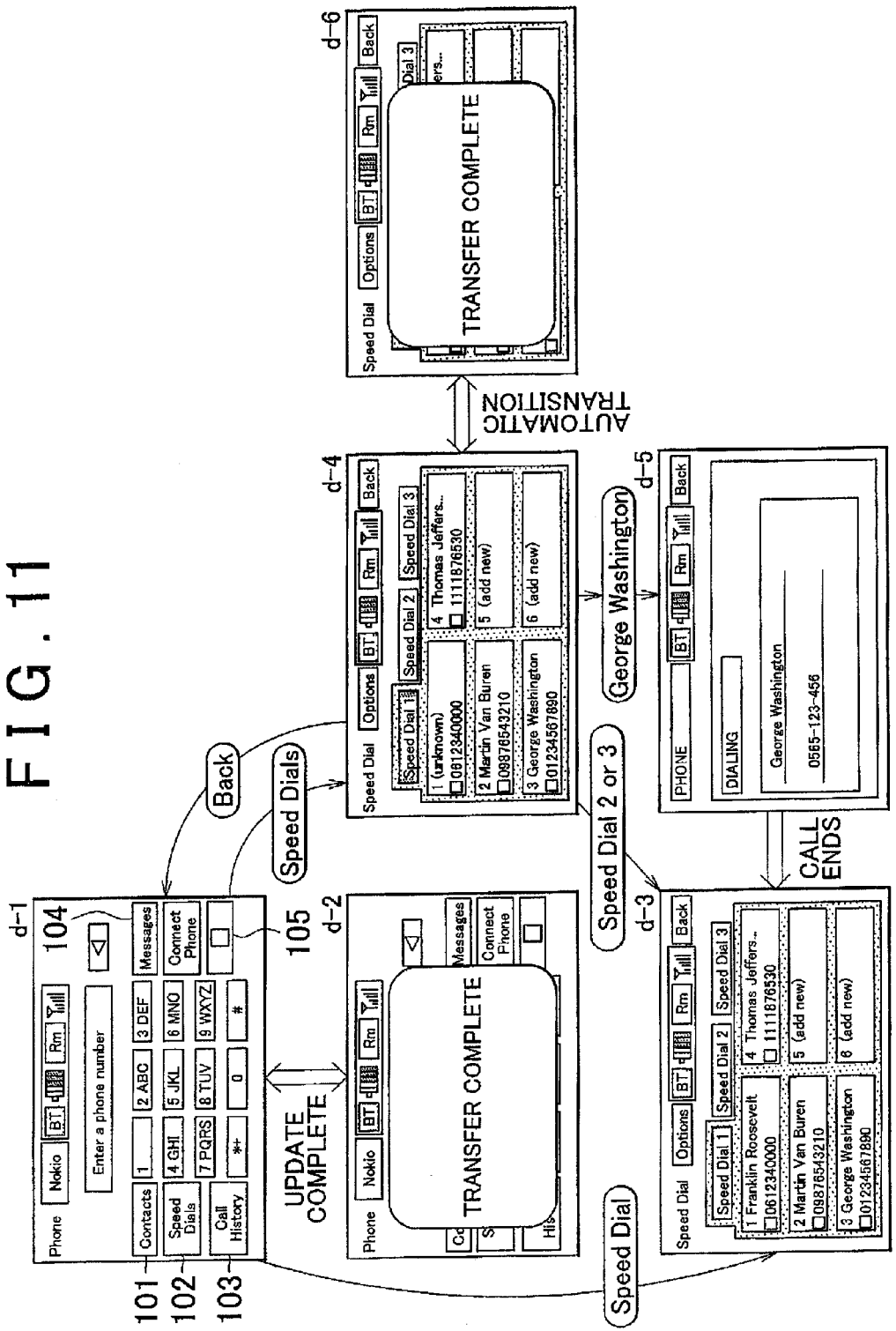
FIG. 11 is an example of a transition example of screens and a phonebook update in the speed dial screen.

FIG. 11 is an example of a transition example of screens and a phonebook update in the speed dial screen. In FIG. 11, a description of a screen transition that is the same as that in FIG. 10 will be omitted. In FIG. 11 as well, "Franklin Roosevelt" that is not displayed in the speed dial screen d-4 is newly displayed in the speed dial screen d-3. Also, the name in the call history before the update that is displayed in speed dial screen d-4, and the phone number associated with that name in the phonebook are cached, so the name and phone number are able to be displayed in the active call screen d-5.

Figure 12:
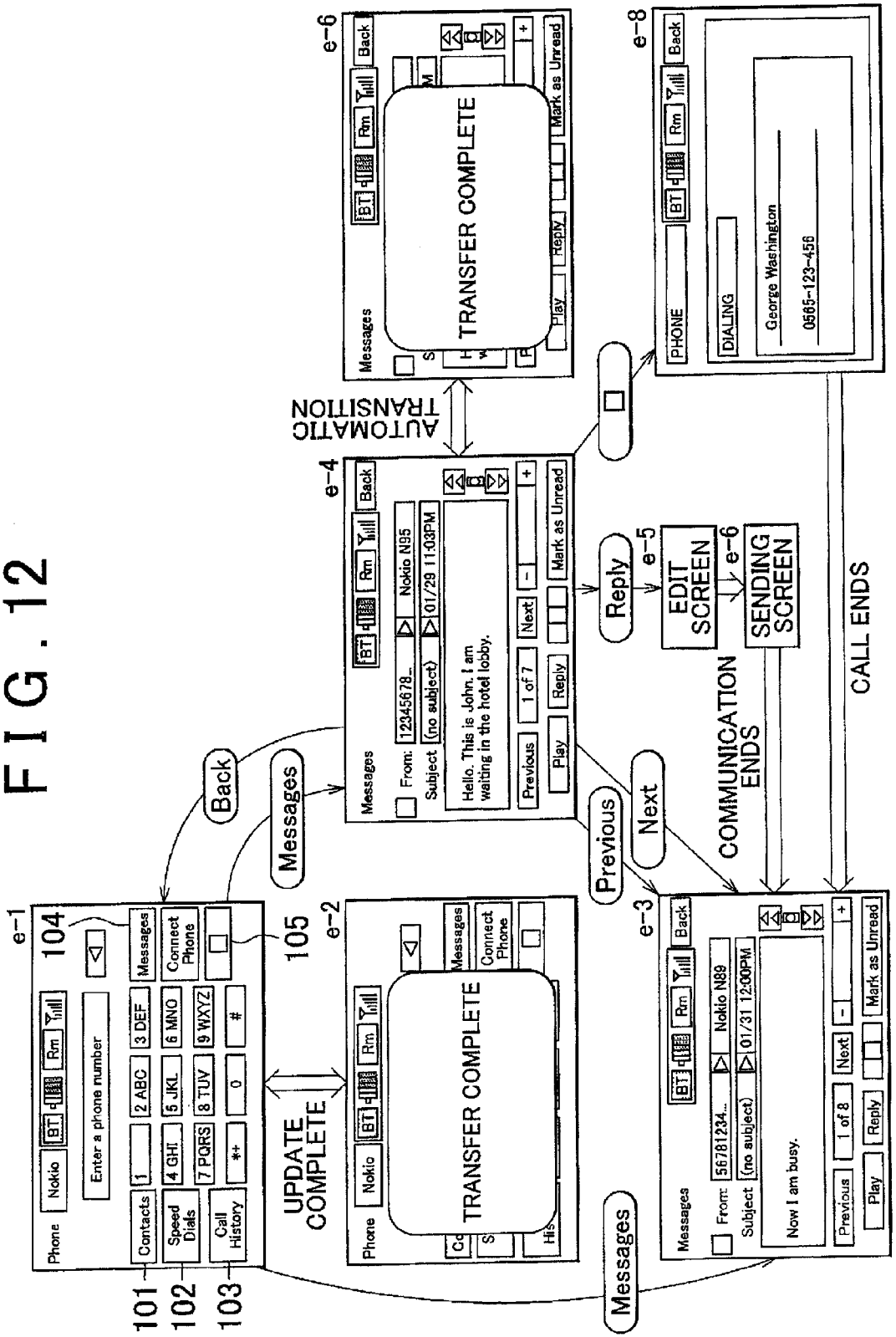
FIG. 12 is an example of a transition example of screens and a phonebook update in the messages screen.

FIG. 12 is an example of a transition example of screens and a phonebook update in the messages screen. In FIG. 12, cases e-1 to e-3 in which the update does not affect the screen transition are the same as in FIGS. 10 and 11. A case in which an update affects the screen transition will be described.

The occupant displays the enter a phone number screen e-1.

If the occupant pushes the Messages button 104 while the enter a phone number screen e-1 is being displayed before the phonebook has finished being updated, the messages screen e-4 is displayed.

If the phonebook finishes being updated while the messages screen e-4 is being displayed, the messages screen e-7, in which the message "Transfer complete" is displayed, is displayed. After several seconds, the screen will switch back to the messages screen e-4 with no message.

In the messages screen e-4, the information necessary to display this messages screen e-4 and the information necessary to display the active call screen e-8 and the edit screen e-5 are cashed, e.g., the information in the sender column, the title column, the message body column, and the like, and the phone numbers associated with the names in the sender column in the phonebook.

If the occupant pushes the Send button 508 from the speed dial screen e-4, the active call screen e-8 is displayed, and if the occupant pushes the Reply button 507, the edit screen e-5 is displayed.

If a call ends, or if a message has finished being sent, the messages screen e-3 is displayed. The update of the SMS received history and the SMS sent history is reflected in the messages screen e-3. Therefore, a message that had not been displayed in the messages screen e-4 will be newly displayed, for example. Also, the messages screen e-3 is also displayed when the occupant pushes the Previous button 505 or the Next button 506 in the messages screen e-4.

(A Case of an Incoming Call)

Figure 13:
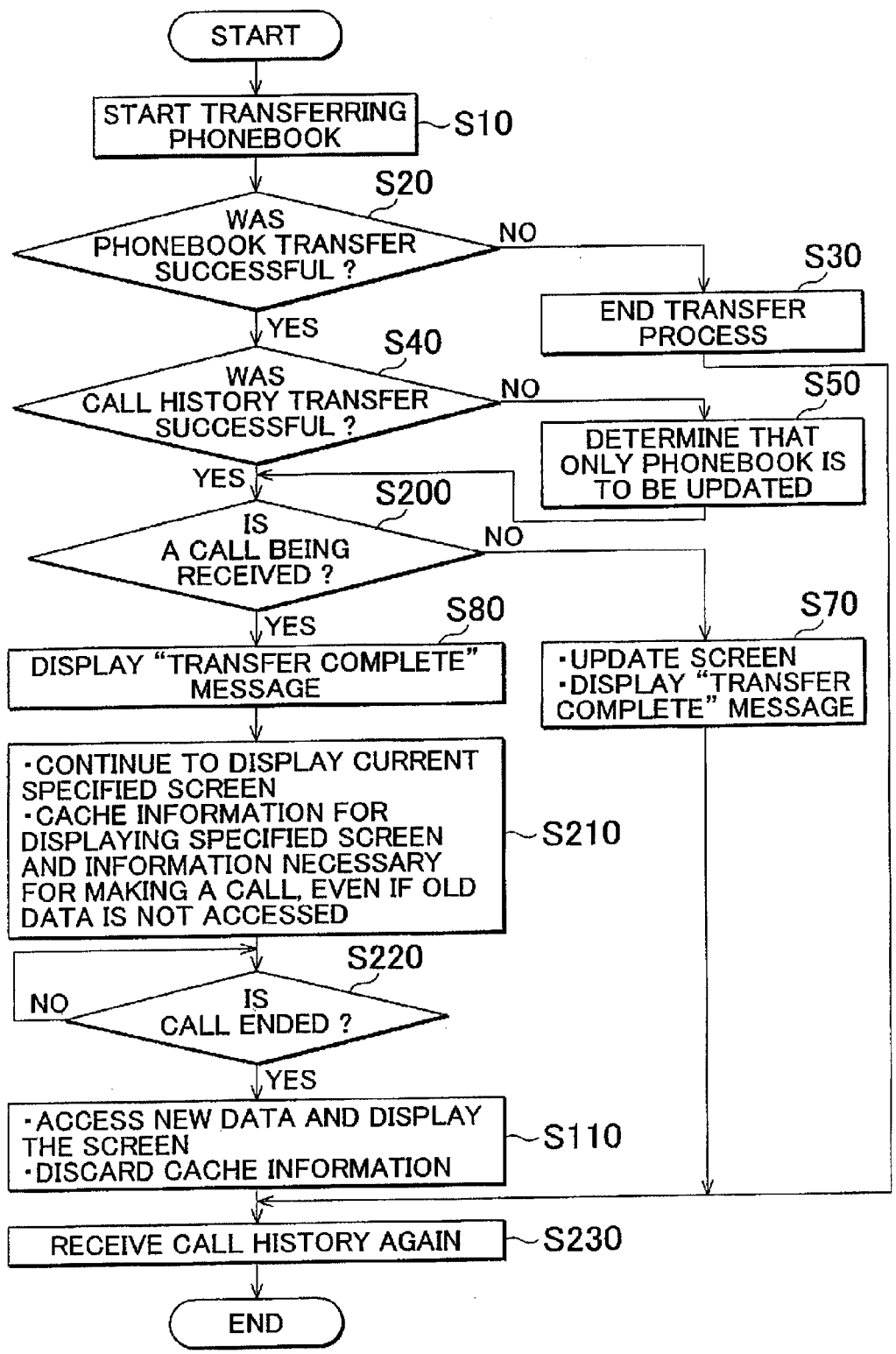
FIG. 13 is an example of a flowchart illustrating a routine by which the on-board device updates a phonebook and the like when there is an incoming call.

A case of an incoming call will be briefly described with reference to FIG. 13. With an incoming call, the flow is the same as it is with an outgoing call. FIG. 13 is an example of a flowchart illustrating a routine by which the on-board device 100 updates a phonebook and the like when there is an incoming call.

The phonebook and call history finish being transferred according to steps S10 to S40. After S40, the state determining portion 31 determines whether the on-board device 100 is receiving a call (S200).

If a call is not being received (i.e., No in S200), the UI display controlling portion 32 updates the screen if the screen is one that needs to be updated, such as a list screen (S70). Also, the "Transfer complete" message is displayed on the display 13.

If a call is being received (i.e., Yes in S200), the UI display controlling portion 32 displays the "Transfer complete" message on the display 13 (S80). As a result, the user is made aware early that the phonebook has been transferred.

Also, if a call is being received, the UI display controlling portion 32 reads the name and image associated with the phone number of the caller from the old phonebook, call history, and images 36a, and displays them on the display 13. Therefore, when the old phonebook, call history, and images 36a are updated while a call is being received, the link between the name and image of the contact displayed in the screen, and the old phonebook, call history, and images 36a is lost. Although the screen being displayed is normally stored in the VRAM or the like of the display 13, and is thus retained even if the old phonebook, call history, and images 36a are updated, the screen that appears during a call is not always able to be displayed after the screen has switched to a navigation screen or the like.

Therefore, the UI display controlling portion 32 keeps displaying the screen that appears during an incoming call, and the information, caching portion 33 caches the information for displaying the incoming calls screen even if the old phonebook, call history, and images 36a are not accessed (S210).

Also, once a call ends (i.e., Yes in S220), the UI display controlling portion 32 updates the screen with the new phonebook and the like (S110). Also, the information caching portion 33 discards the cached information.

Here, the last received call history displayed on the incoming calls screen is not included in the call history, so preferably only the call history is updated. Therefore, the updating portion 34 receives the call history again (S230). If PBAP supports receiving the call history again, PBAP is used, and if PBAP does not support receiving the call history again, a profile for transferring a desired file, such as Object Push Profile (OPP) may be used.

In this way, with an incoming call as well, the on-board device 100 of this example embodiment is able to notify the occupant soon after the transfer of the phonebook is complete, and the screen when a call is being received can be maintained, so it will not be annoying to the occupant.

As described above, with the on-board device 100 of the example embodiment, when the phonebook and the like are being used, that information is cached, which enables the phonebook and the like to be updated quickly. Caching the information also makes it possible to prevent an operation by the occupant from being interrupted and other annoyances.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. An information processing apparatus comprising:
   a data storage portion that stores a plurality of data records in which second data is associated with first data;
   a caching portion that caches the first data separately from the data records stored in the data storage portion;
   a communicating portion that communicates with an external device;
   an updating portion that receives the data records from the external device and updates the data records in the data storage portion;
   a screen controlling portion that displays, on a screen, one or more of the first data or the second data read from the data storage portion or the caching portion, and that receives a specifying operation specifying the first data;
   a determining portion that determines, when the updating portion has received the data records from the external device, whether the information processing apparatus is in a state, in which the screen controlling portion displays the first data or the second data on the screen and control that uses the first data will be started in case the screen controlling portion will receive the specifying operation; and
   when it is determined by the determining portion that the information processing apparatus is in the state, the caching portion caches the first data separately from the data records stored in the data storage portion before the control that uses the first data is started and thereafter the updating portion updates the data records in the data storage portion and the screen controlling portion displays, on the screen, one or more of the first data or the second data read from the caching portion.

2. The information processing apparatus according to claim 1, wherein when the updating portion finishes updating the data records in the data storage portion, the screen controlling portion displays an indication that the update is complete on the screen, regardless of whether the information processing apparatus is in the state.

3. The information processing apparatus according to claim 1, wherein when the screen controlling portion is displaying a specified screen registered in advance, the determining portion determines that the information processing apparatus is in the state.

4. The information processing apparatus according to claim 3, wherein when it is determined by the determining portion that the information processing apparatus is in the state, the screen controlling portion continues to display the specified screen without updating the specified screen.

5. The information processing apparatus according to claim 3, wherein the data records are records of a phonebook in which the first data is phone number and the second data is name.

6. The information processing apparatus according to claim 5, wherein the specified screen is one of i) a first screen that displays one or more phone numbers for the name of one person, and that, in response to receiving one specifying operation, calls the phone number selected by the specifying operation, and ii) a second screen that displays one or more phone numbers registered in the information processing apparatus in advance, and that, in response to receiving one specifying operation, calls the phone number selected by the specifying operation.

7. The information processing apparatus according to claim 5, wherein the external device is a phone, and the specified screen is a third screen that displays one or more call history data of the phone making a call, the phone receiving a call, or the phone receiving a missed call, received from the external device, and that, in response to one specifying operation, calls a phone number in the call history data selected by the specifying operation.

8. The information processing apparatus according to claim 5, wherein the external device is a phone, and the specified screen is a fourth screen that displays e-mail data of e-mail that has been received by the phone and in which a phone number of a sender or a name associated with the phone number in the phonebook is displayed, received from the external device, and that, in response to receiving one specifying operation, calls a phone number selected by the specifying operation.

9. The information processing apparatus according to claim 5, further comprising a communication controlling portion that makes a request to the phone to call a phone number that is the first data specified by the specifying operation, as the control that uses the first data.

10. The information processing apparatus according to claim 3, wherein the caching portion caches information displayed on the specified screen by the screen controlling portion when it is determined that the information processing apparatus is in the state.

11. The information processing apparatus according to claim 10, wherein the caching portion discards the cached information when the screen controlling portion receives an operation to stop displaying the specified screen, or an operation to switch the first data or the second data being displayed on the specified screen with other first data or second data.

12. The information processing apparatus according to claim 1, wherein the communicating portion is a communication module that communicates with the external device according to a Bluetooth communication standard.

13. A navigation system comprising:
   the information processing apparatus according to claim 1;
   a position detecting portion that detects a position of the navigation system; and a host position displaying portion that indicates the position of the navigation system on a map displayed on a screen.

14. A data updating method for an information processing apparatus that includes a data storage portion that stores a plurality of data records in which second data is associated with first data, the data updating method comprising:

communicating with an external device;

displaying one or more first data or second data read from the data storage portion or a caching portion on a screen and receiving a specifying operation that specifies the first data;

determining, when data records for updating the data records in the data storage portion have been received from the external device, whether the information processing apparatus is in a state, in which the first data or the second data are displayed on the screen and control that uses the first data will be started in case the specifying operation will be received;

when it is determined that the information processing apparatus is in the state, caching the first data separately from the data records stored in the data storage portion before the control that uses the first data is started, and thereafter updating the data records in the data storage portion and displaying, on the screen, one or more of the first data and second data read from the caching portion.

* * * * *